United States Patent
Roy et al.

(10) Patent No.: US 9,555,378 B2
(45) Date of Patent: Jan. 31, 2017

(54) COMPOSITE POLYAMIDE MEMBRANE HAVING PREFERRED AZO CONTENT

(71) Applicant: Dow Global Technologies LLC, Midland, MI (US)

(72) Inventors: Abhishek Roy, Edina, MN (US); Robert C. Cieslinski, Midland, MI (US); Bruce B. Gerhart, Midland, MI (US); David D. Hawn, Midland, MI (US); Mou Paul, Edina, MN (US); XiaoHua Qiu, Midland, MI (US); Mark A. Rickard, Midland, MI (US); Steven Rosenberg, Shorewood, MN (US); Ian A. Tomlinson, Midland, MI (US); Chengli Zu, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/102,879

(22) PCT Filed: Dec. 15, 2014

(86) PCT No.: PCT/US2014/070308
§ 371 (c)(1),
(2) Date: Jun. 9, 2016

(87) PCT Pub. No.: WO2015/105638
PCT Pub. Date: Jul. 16, 2015

(65) Prior Publication Data
US 2016/0303520 A1     Oct. 20, 2016

Related U.S. Application Data

(60) Provisional application No. 61/925,525, filed on Jan. 9, 2014.

(51) Int. Cl.
*B01D 39/00* (2006.01)
*B01D 39/14* (2006.01)
(Continued)

(52) U.S. Cl.
CPC ........... *B01D 71/56* (2013.01); *B01D 67/0006* (2013.01); *B01D 69/125* (2013.01); *B01D 2323/36* (2013.01); *B01D 2323/40* (2013.01)

(58) Field of Classification Search
CPC ....... B01D 71/56; B01D 69/125; B01D 69/12; B01D 67/0006; B01D 61/025; B01D 2323/40; B01D 67/0093; B01D 2323/30; B01D 65/08
See application file for complete search history.

(56) References Cited

U.S. PATENT DOCUMENTS 3,304,310 A    2/1967  Hari et al.
3,686,116 A    8/1972  Rio
(Continued)

FOREIGN PATENT DOCUMENTS

CN    1035338    9/1989
CN    1935338    3/2007
(Continued)

OTHER PUBLICATIONS

Li et al, Polyamide Thin Film Composite Membranes Prepared from Isomeric Biphenyl Tetraacyl Chloride and m-phenylenediamine, Journal of Membrane Science, 315, (2008) 20-27.
(Continued)

*Primary Examiner* — Ana Fortuna
(74) *Attorney, Agent, or Firm* — Edward W. Black

(57) ABSTRACT

A thin film composite polyamide membrane comprising a porous support and a thin film polyamide layer characterized by possessing an azo (—N═N—) content of from 0.75% to 0.95%, as measured by pyrolysis gas chromatography.

9 Claims, 1 Drawing Sheet

(51) Int. Cl.
*B29C 44/04* (2006.01)
*B01D 67/00* (2006.01)
*B01D 29/46* (2006.01)
*B01D 71/56* (2006.01)
*B01D 69/12* (2006.01)

(56) References Cited

U.S. PATENT DOCUMENTS

| | | | |
|---|---|---|---|
| 3,694,390 A | 9/1972 | Winslow | |
| 3,878,109 A | 4/1975 | Ikeda et al. | |
| 4,259,183 A | 3/1981 | Cadotte | |
| 4,265,745 A | 5/1981 | Kawaguchi et al. | |
| 4,277,344 A | 7/1981 | Cadotte | |
| 4,415,455 A | 11/1983 | Osei-Gyimah et al. | |
| 4,529,646 A | 7/1985 | Sundet | |
| 4,606,943 A | 8/1986 | Rak et al. | |
| 4,626,468 A | 12/1986 | Sundet | |
| 4,643,829 A | 2/1987 | Sundet | |
| 4,719,062 A | 1/1988 | Sundet | |
| 4,758,343 A | 7/1988 | Sasaki et al. | |
| 4,761,234 A | 8/1988 | Uemura et al. | |
| 4,769,148 A | 9/1988 | Fibiger et al. | |
| 4,783,346 A | 11/1988 | Sundet | |
| 4,812,238 A * | 3/1989 | Cadotte | B01D 67/0093 210/500.3 |
| 4,812,270 A | 3/1989 | Cadotte et al. | |
| 4,830,885 A | 5/1989 | Tran et al. | |
| 4,872,984 A | 10/1989 | Tomaschke | |
| 4,888,116 A | 12/1989 | Cadotte et al. | |
| 4,909,943 A | 3/1990 | Fibiger et al. | |
| 4,948,507 A | 8/1990 | Tomaschke | |
| 4,950,404 A | 8/1990 | Chau | |
| 4,960,517 A | 10/1990 | Cadotte | |
| 4,964,998 A * | 10/1990 | Cadotte | B01D 61/025 210/500.38 |
| 5,015,380 A | 5/1991 | Sundet | |
| 5,015,382 A | 5/1991 | Sundet | |
| 5,019,264 A | 5/1991 | Arthur | |
| 5,049,282 A | 9/1991 | Linder et al. | |
| 5,051,178 A | 9/1991 | Uemura et al. | |
| 5,160,619 A | 11/1992 | Yamaguchi et al. | |
| 5,180,802 A | 1/1993 | Hartman et al. | |
| 5,246,587 A | 9/1993 | Tomaschke | |
| 5,254,261 A | 10/1993 | Tomaschke et al. | |
| 5,290,452 A | 3/1994 | Schucker | |
| 5,336,409 A | 8/1994 | Hachisuka et al. | |
| 5,510,527 A | 4/1996 | Hachisuka et al. | |
| 5,576,057 A | 11/1996 | Hirose et al. | |
| 5,582,725 A | 12/1996 | McCray et al. | |
| 5,593,588 A | 1/1997 | Kim et al. | |
| 5,614,099 A | 3/1997 | Hirose et al. | |
| 5,616,249 A | 4/1997 | Hodgdon | |
| 5,693,227 A | 12/1997 | Costa | |
| 5,733,602 A | 3/1998 | Hirose et al. | |
| 5,744,039 A | 4/1998 | Itoh et al. | |
| 5,783,079 A | 7/1998 | Kumano et al. | |
| 5,843,351 A | 12/1998 | Hirose et al. | |
| 5,876,602 A | 3/1999 | Jons et al. | |
| 5,989,426 A | 11/1999 | Hirose et al. | |
| 6,024,873 A | 2/2000 | Hirose et al. | |
| 6,086,764 A | 7/2000 | Linder et al. | |
| 6,162,358 A | 12/2000 | Li et al. | |
| 6,245,234 B1 | 6/2001 | Koo et al. | |
| 6,280,853 B1 | 8/2001 | Mickols | |
| 6,337,018 B1 | 1/2002 | Mickols | |
| 6,406,626 B1 * | 6/2002 | Murakami | B01D 69/00 210/500.37 |
| 6,464,873 B1 | 10/2002 | Tomaschke | |
| 6,521,130 B1 | 2/2003 | Kono et al. | |
| 6,562,266 B2 | 5/2003 | Mickols | |
| 6,723,241 B2 | 4/2004 | Mickols | |
| 6,723,422 B1 | 4/2004 | Hirose et al. | |
| 6,777,488 B1 | 8/2004 | Araki et al. | |
| 6,878,278 B2 | 4/2005 | Mickols | |
| 7,279,097 B2 | 10/2007 | Tomioka et al. | |
| 7,806,275 B2 | 10/2010 | Murphy et al. | |
| 7,815,987 B2 | 10/2010 | Mickols et al. | |
| 7,818,349 B2 * | 10/2010 | Frost | G06F 17/30445 707/802 |
| 8,147,735 B2 | 4/2012 | Buschmann | |
| 8,177,978 B2 | 5/2012 | Kurth et al. | |
| 8,567,612 B2 | 10/2013 | Kurth et al. | |
| 8,603,340 B2 | 12/2013 | Kurth et al. | |
| 8,968,828 B2 * | 3/2015 | Roy | B01D 67/0093 210/500.38 |
| 8,999,449 B2 | 4/2015 | Paul et al. | |
| 9,073,015 B2 | 7/2015 | Rosenberg et al. | |
| 2001/0050252 A1 * | 12/2001 | Mickols | B01D 71/56 210/490 |
| 2008/0185332 A1 | 8/2008 | Niu et al. | |
| 2009/0071903 A1 | 3/2009 | Nakatsuji et al. | |
| 2009/0107922 A1 | 4/2009 | Zhang et al. | |
| 2009/0220690 A1 | 9/2009 | Niu et al. | |
| 2009/0272692 A1 | 11/2009 | Kurth et al. | |
| 2010/0062156 A1 | 3/2010 | Kurth et al. | |
| 2010/0181250 A1 * | 7/2010 | Kim | B01D 67/0006 210/500.38 |
| 2011/0005997 A1 | 1/2011 | Kurth et al. | |
| 2011/0049055 A1 | 3/2011 | Wang et al. | |
| 2012/0003387 A1 | 1/2012 | Kim et al. | |
| 2012/0080058 A1 | 4/2012 | Isaias et al. | |
| 2012/0248027 A1 | 10/2012 | Sasaki et al. | |
| 2012/0261332 A1 * | 10/2012 | Takagi | B01D 67/0093 210/500.3 |
| 2012/0261344 A1 | 10/2012 | Kurth et al. | |
| 2012/0305473 A1 * | 12/2012 | Ogawa | B01D 69/02 210/500.38 |
| 2013/0089727 A1 | 4/2013 | Nilsen et al. | |
| 2013/0126419 A1 * | 5/2013 | Ogawa | B01D 69/10 210/489 |
| 2013/0256215 A1 * | 10/2013 | Nakatsuji | B01D 69/02 210/500.33 |
| 2013/0287944 A1 | 10/2013 | Paul et al. | |
| 2013/0287946 A1 | 10/2013 | Jons et al. | |
| 2014/0170314 A1 | 6/2014 | Zhang et al. | |
| 2014/0199483 A1 * | 7/2014 | Roy | B01D 69/125 427/244 |
| 2014/0206900 A1 | 7/2014 | Qiu et al. | |
| 2014/0231138 A1 * | 8/2014 | Mansperger | E21B 44/00 175/24 |
| 2014/0231338 A1 | 8/2014 | Takaya et al. | |
| 2014/0264161 A1 | 9/2014 | Roy et al. | |
| 2014/0264162 A1 | 9/2014 | Qiu et al. | |
| 2014/0272134 A1 | 9/2014 | Roy et al. | |
| 2014/0370191 A1 | 12/2014 | Rosenberg et al. | |
| 2015/0129485 A1 | 5/2015 | Roy et al. | |
| 2015/0147470 A1 | 5/2015 | Arrowood et al. | |
| 2015/0151255 A1 | 6/2015 | Roy et al. | |
| 2015/0157990 A1 | 6/2015 | Roy et al. | |
| 2015/0165387 A1 | 6/2015 | Roy et al. | |
| 2015/0174534 A1 | 6/2015 | Paul et al. | |
| 2015/0298066 A1 | 10/2015 | Roy et al. | |
| 2015/0306548 A1 | 10/2015 | Roy et al. | |
| 2015/0314243 A1 | 11/2015 | Roy et al. | |
| 2015/0343393 A1 * | 12/2015 | Yoneda | B01D 67/0006 210/490 |

FOREIGN PATENT DOCUMENTS

| | | |
|---|---|---|
| CN | 102219673 | 10/2011 |
| EP | 556569 | 11/1993 |
| WO | 2013048762 | 4/2013 |
| WO | 2013048763 | 4/2013 |
| WO | 2013048765 | 4/2013 |
| WO | 2015084511 | 6/2015 |
| WO | 2015084512 | 6/2015 |
| WO | 2015105630 | 7/2015 |
| WO | 2015105631 | 7/2015 |
| WO | 2015105632 | 7/2015 |
| WO | 2015105636 | 7/2015 |
| WO | 2015105637 | 7/2015 |

(56) References Cited

FOREIGN PATENT DOCUMENTS

| WO | 2015105639 | 7/2015 |
|----|------------|--------|
| WO | 2015175254 | 11/2015 |
| WO | 2015175256 | 11/2015 |

OTHER PUBLICATIONS

Petersen, Composite Reverse Osmosis and Nanofiltration Membranes, Journal of Membrane Science, 83, (1993) 81-150.

Plum, et al., Rapid Qualitative Pyrolysis GC-MS Analysis of Carcinogenic Aromatic Amines From Dyed Textiles, Chromatographia, vol. 57, (2003), pp. S243-S248.

Kim, et al., Preparation of High Flux Thin Film Composite Polyamide Membrane: The Effect of Alkyl Phosphate Additives during Interfacial Polymerization, Desalination, vol. 308, (2013), pp. 111-114.

* cited by examiner

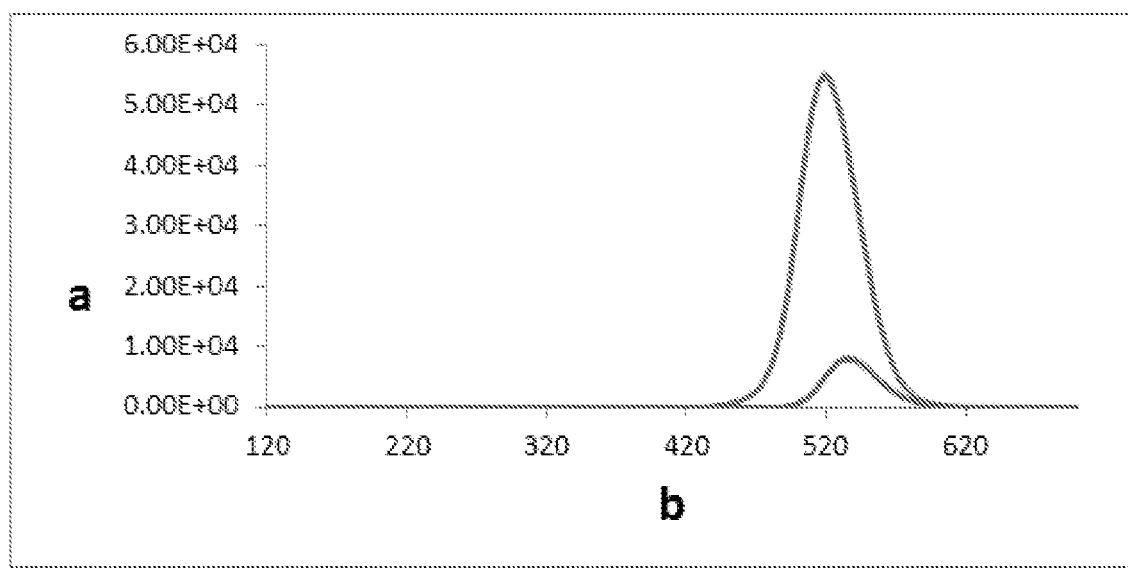

COMPOSITE POLYAMIDE MEMBRANE HAVING PREFERRED AZO CONTENT

FIELD

The present invention is generally directed toward composite polyamide membranes along with methods for making and using the same.

INTRODUCTION

Composite polyamide membranes are used in a variety of fluid separations. One common class of membranes includes a porous support coated with a "thin film" polyamide layer. The thin film layer may be formed by an interfacial polycondensation reaction between polyfunctional amine (e.g. m-phenylenediamine) and polyfunctional acyl halide (e.g. trimesoyl chloride) monomers which are sequentially coated upon the support from immiscible solutions, see for example U.S. Pat. No. 4,277,344 to Cadotte. U.S. Pat. No. 4,812,270 and U.S. Pat. No. 4,888,116 also to Cadotte describe the post-treatment of such membranes with phosphoric or nitrous acid. (See also WO 2013/047398, US2013/0256215, US2013/0126419, US2012/0305473, US2012/0261332 and US2012/0248027). U.S. Pat. No. 6,878,278 to Mickols describes the addition of tri-hydrocarbyl phosphate compounds to the monomer mixture prior to polymerization. The search continues for new combinations of monomers, additives and post-treatments that further improve polyamide membrane performance.

SUMMARY

The invention includes a thin film composite polyamide membrane comprising a porous support and a thin film polyamide layer characterized by possessing an azo (—N=N—) content of from 0.75% to 0.95%, as measured by pyrolysis gas chromatography. In a preferred embodiment, the thin film polyamide layer producing a ratio of dimers represented by Formula II and III from 2.0% to 4.0% upon pyrolysis at 650° C. as measured by GS MS.

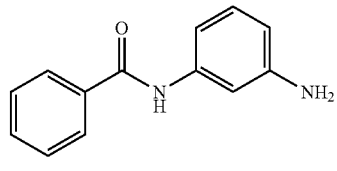

m/z = 212

Formula (II)

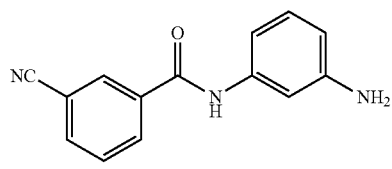

m/z = 237

Formula (III)

Many embodiments are described including applications for such membranes.

BRIEF DESCRIPTION OF THE DRAWINGS

FIG. 1 is a plot of a MS response (a) for a representative thin film polyamide layer as a function of temperature (b) corresponding to a representative thin film polyamide layer.

DETAILED DESCRIPTION

The invention is not particularly limited to a specific type, construction or shape of composite membrane or application. For example, the present invention is applicable to flat sheet, tubular and hollow fiber polyamide membranes useful in a variety of applications including forward osmosis (FO), reverse osmosis (RO), nano filtration (NF), ultra filtration (UF), micro filtration (MF) and pressure retarded fluid separations. However, the invention is particularly useful for membranes designed for RO and NF separations. RO composite membranes are relatively impermeable to virtually all dissolved salts and typically reject more than about 95% of salts having monovalent ions such as sodium chloride. RO composite membranes also typically reject more than about 95% of inorganic compounds as well as organic molecules with molecular weights greater than approximately 100 Daltons. NF composite membranes are more permeable than RO composite membranes and typically reject less than about 95% of salts having monovalent ions while rejecting more than about 50% (and often more than 90%) of salts having divalent ions—depending upon the species of divalent ion. NF composite membranes also typically reject particles in the nanometer range as well as organic molecules having molecular weights greater than approximately 200 to 500 Daltons (AMU).

Examples of composite polyamide membranes include a flat sheet composite membrane comprising a bottom layer (back side) of a nonwoven backing web (e.g. PET scrim), a middle layer of a porous support having a typical thickness of about 25-125 µm and top layer (front side) comprising a thin film polyamide layer having a thickness typically less than about 1 micron, e.g. from 0.01 micron to 1 micron but more commonly from about 0.01 to 0.1 µm. The porous support is typically a polymeric material having pore sizes which are of sufficient size to permit essentially unrestricted passage of permeate but not large enough so as to interfere with the bridging over of a thin film polyamide layer formed thereon. For example, the pore size of the support preferably ranges from about 0.001 to 0.5 µm. Non-limiting examples of porous supports include those made of: polysulfone, polyether sulfone, polyimide, polyamide, polyetherimide, polyacrylonitrile, poly(methyl methacrylate), polyethylene, polypropylene, and various halogenated polymers such as polyvinylidene fluoride. For RO and NF applications, the porous support provides strength but offers little resistance to fluid flow due to its relatively high porosity.

Due to its relative thinness, the polyamide layer is often described in terms of its coating coverage or loading upon the porous support, e.g. from about 2 to 5000 mg of polyamide per square meter surface area of porous support and more preferably from about 50 to 500 mg/m$^2$. The polyamide layer is preferably prepared by an interfacial polycondensation reaction between a polyfunctional amine monomer and a polyfunctional acyl halide monomer upon the surface of the porous support as described in U.S. Pat. No. 4,277,344 and U.S. Pat. No. 6,878,278. More specifically, the polyamide membrane layer may be prepared by interfacially polymerizing a polyfunctional amine monomer with a polyfunctional acyl halide monomer, (wherein each term is intended to refer both to the use of a single species or multiple species), on at least one surface of a porous support. As used herein, the term "polyamide" refers to a polymer in which amide linkages (—C(O)NH—) occur along the molecular chain. The polyfunctional amine and polyfunctional acyl halide monomers are most commonly applied to the porous support by way of a coating step from solution, wherein the polyfunctional amine monomer is typically coated from an aqueous-based or polar solution and the polyfunctional acyl halide from an organic-based or non-polar solution. Although the coating steps need not follow a specific order, the polyfunctional amine monomer is preferably first coated on the porous support followed by the polyfunctional acyl halide. Coating can be accomplished by spraying, film coating, rolling, or through the use of a dip tank among other coating techniques. Excess solution may be removed from the support by air knife, dryers, ovens and the like.

The polyfunctional amine monomer comprises at least two primary amine groups and may be aromatic (e.g., m-phenylenediamine (mPD), p-phenylenediamine, 1,3,5-triaminobenzene, 1,3,4-triaminobenzene, 3,5-diaminobenzoic acid, 2,4-diaminotoluene, 2,4-diaminoanisole, and xylylenediamine) or aliphatic (e.g., ethylenediamine, propylenediamine, cyclohexane-1,3-diameine and tris (2-diaminoethyl) amine). One particularly preferred polyfunctional amine is m-phenylene diamine (mPD). The polyfunctional amine monomer may be applied to the porous support as a polar solution. The polar solution may contain from about 0.1 to about 10 wt % and more preferably from about 1 to about 6 wt % polyfunctional amine monomer. In one set of embodiments, the polar solutions includes at least 2.5 wt % (e.g. 2.5 to 6 wt %) of the polyfunctional amine monomer. Once coated on the porous support, excess solution may be removed.

The polyfunctional acyl halide monomer comprises at least two acyl halide groups and preferably no carboxylic acid functional groups and may be coated from a non-polar solvent although the polyfunctional acyl halide may be alternatively delivered from a vapor phase (e.g., for polyfunctional acyl halides having sufficient vapor pressure). The polyfunctional acyl halide is not particularly limited and aromatic or alicyclic polyfunctional acyl halides can be used along with combinations thereof. Non-limiting examples of aromatic polyfunctional acyl halides include: trimesic acyl chloride, terephthalic acyl chloride, isophthalic acyl chloride, biphenyl dicarboxylic acyl chloride, and naphthalene dicarboxylic acid dichloride. Non-limiting examples of alicyclic polyfunctional acyl halides include: cyclopropane tri carboxylic acyl chloride, cyclobutane tetra carboxylic acyl chloride, cyclopentane tri carboxylic acyl chloride, cyclopentane tetra carboxylic acyl chloride, cyclohexane tri carboxylic acyl chloride, tetrahydrofuran tetra carboxylic acyl chloride, cyclopentane dicarboxylic acyl chloride, cyclobutane dicarboxylic acyl chloride, cyclohexane dicarboxylic acyl chloride, and tetrahydrofuran dicarboxylic acyl chloride. One preferred polyfunctional acyl halide is trimesoyl chloride (TMC). The polyfunctional acyl halide may be dissolved in a non-polar solvent in a range from about 0.01 to 10 wt %, preferably 0.05 to 3% wt % and may be delivered as part of a continuous coating operation. In one set of embodiments wherein the polyfunctional amine monomer concentration is less than 3 wt %, the polyfunctional acyl halide is less than 0.3 wt %. Suitable solvents are those which are capable of dissolving the polyfunctional acyl halide and which are immiscible with water; e.g. paraffins (e.g. hexane, cyclohexane, heptane, octane, dodecane), isoparaffins (e.g. ISOPAR™ L), aromatics (e.g. Solvesso™ aromatic fluids, Varsol™ non-dearomatized fluids, benzene, alkylated benzene (e.g. toluene, xylene, trimethylbenzene isomers, diethylbenzene)) and halogenated hydrocarbons (e.g. FREON™ series, chlorobenzene, di and trichlorobenzene) or mixtures thereof. Preferred solvents include those which pose little threat to the ozone layer and which are sufficiently safe in terms of flashpoints and flammability to undergo routine processing without taking special precautions. A preferred solvent is ISOPAR™ available from Exxon Chemical Company. The non-polar solution may include additional constituents including co-solvents, phase transfer agents, solubilizing agents, complexing agents and acid scavengers wherein individual additives may serve multiple functions. Representative co-solvents include: benzene, toluene, xylene, mesitylene, ethyl benzene—diethylene glycol dimethyl ether, cyclohexanone, ethyl acetate, butyl Carbitol™ acetate, methyl laurate and acetone. A representative acid scavenger includes N, N-diisopropylethylamine (DIEA). The non-polar solution may also include small quantities of water or other polar additives but preferably at a concentration below their solubility limit in the non-polar solution.

One or both of the polar and non-polar solutions additionally includes a tri-hydrocarbyl phosphate compound as represented by Formula I.

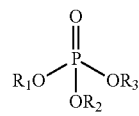

Formula (I)

wherein "P" is phosphorous, "0" is oxygen and $R_1$, $R_2$ and $R_3$ are independently selected from hydrogen and hydrocarbyl groups comprising from 1 to 10 carbon atoms, with the proviso that no more than one of $R_1$, $R_2$ and $R_3$ are hydrogen. $R_1$, $R_2$ and $R_3$ are preferably independently selected from aliphatic and aromatic groups. Applicable aliphatic groups include both branched and unbranched species, e.g. methyl, ethyl, propyl, isopropyl, butyl, isobutyl, pentyl, 2-pentyl, 3-pentyl. Applicable cyclic groups include cyclopentyl and cyclohexyl. Applicable aromatic groups include phenyl and naphthyl groups. Cyclo and aromatic groups may be linked to the phosphorous atom by way of an aliphatic linking group, e.g., methyl, ethyl, etc. The aforementioned aliphatic and aromatic groups may be unsubstituted or substituted (e.g., substituted with methyl, ethyl, propyl, hydroxyl, amide, ether, sulfone, carbonyl, ester, cyanide, nitrile, isocyanate, urethane, beta-hydroxy ester, etc); however, unsubstituted alkyl groups having from 3 to 10 carbon atoms are preferred. Specific examples of tri-hydrocarbyl phosphate compounds include: triethyl phosphate, tripropyl phosphate, tributyl phosphate, tripentyl phosphate, trihexyl phosphate, triphenyl phosphate, propyl biphenyl phosphate, dibutyl phenyl phosphate, butyl diethyl phosphate, dibutyl hydrogen phosphate, butyl heptyl hydrogen phosphate and butyl heptyl hexyl phosphate. The specific compound selected should be at least partially soluble in the solution from which it is applied. Additional examples of such compounds are described in U.S. Pat. No. 6,878,278, U.S. Pat. No. 6,723,241, U.S. Pat. No. 6,562,266 and U.S. Pat. No. 6,337,018.

When combined within the non-polar solution, the solution preferably includes from 0.001 to 10 wt % and more preferably from 0.01 to 1 wt % of the tri-hydrocarbyl phosphate compound. In another embodiment, the non-polar solution includes the tri-hydrocarbyl phosphate compound in a molar (stoichiometric) ratio of 1:5 to 5:1 and more preferably 1:1 to 3:1 with the polyfunctional acyl halide monomer. When combined within the polar solution, the solution preferably includes from 0.001 to 10 wt % and more preferably from 0.1 to 1 wt % of the tri-hydrocarbyl phosphate compound. A preferred species for addition to the polar phase includes triethylphosphate.

Once brought into contact with one another, the polyfunctional acyl halide and polyfunctional amine monomers react at their surface interface to form a polyamide layer or film. This layer, often referred to as a polyamide "discriminating layer" or "thin film layer," provides the composite membrane with its principal means for separating solute (e.g. salts) from solvent (e.g. aqueous feed). The reaction time of the polyfunctional acyl halide and the polyfunctional amine monomer may be less than one second but contact times typically range from about 1 to 60 seconds. The removal of the excess solvent can be achieved by rinsing the membrane with water and then drying at elevated temperatures, e.g. from about 40° C. to about 120° C., although air drying at ambient temperatures may be used. However, for purposes of the present invention, the membrane is preferably not permitted to dry and is simply rinsed (e.g. dipped) with water and optionally stored in a wet state. Once formed, the polyamide layer is exposed to nitrous acid. A variety of techniques is described in U.S. Pat. No. 4,888,116 and are incorporated herein by reference. It is believed that the nitrous acid reacts with the residual primary amine groups present in the polyamide discrimination layer to form diazonium salt groups. At least a portion of these diazonium salt groups hydrolyze to form phenol groups or azo crosslinks via diazo-coupling. Although the aqueous solution may include nitrous acid, it preferably includes reagents that form nitrous acid in situ, e.g. an alkali metal nitrite in an acid solution or nitrosyl sulfuric acid. Because nitrous acid is volatile and subject to decomposition, it is preferably formed by reaction of an alkali metal nitrite in an acidic solution in contact with the polyamide discriminating layer. Generally, if the pH of the aqueous solution is less than about 7, (preferably less than about 5), an alkali metal nitrite will react to liberate nitrous acid. Sodium nitrite reacted with hydrochloric or sulfuric acid in an aqueous solution is especially preferred for formation of nitrous acid. The aqueous solution may further include wetting agents or surfactants. The concentration of the nitrous acid in the aqueous solution is preferably from 0.01 to 1 wt %. Generally, the nitrous acid is more soluble at 5° than at 20° C. and somewhat higher concentrations of nitrous acid are operable at lower temperatures. Higher concentrations are operable so long as the membrane is not deleteriously affected and the solutions can be handled safely. In general, concentrations of nitrous acid higher than about one-half (0.5) percent are not preferred because of difficulties in handling these solutions. Preferably, the nitrous acid is present at a concentration of about 0.1 weight percent or less because of its limited solubility at atmospheric pressure. The temperature at which the membrane is contacted can vary over a wide range. Inasmuch as the nitrous acid is not particularly stable, it is generally desirable to use contact temperatures in the range from about 0° to about 30° C., with temperatures in the range from 0° to about 20° C. being preferred. Temperatures higher than this range can increase the need for ventilation or super-atmospheric pressure above the treating solution. Temperatures below the preferred range generally result in reduced reaction and diffusion rates.

The reaction between the nitrous acid and the primary amine groups occurs relatively quickly once the nitrous acid has diffused into the membrane. The time required for diffusion and the desired reaction to occur will depend upon the concentration of nitrous acid, any pre-wetting of the membrane, the concentration of primary amine groups present and the temperature at which contact occurs. Contact times may vary from a few minutes to a few days. The optimum reaction time can be readily determined empirically for a particular membrane and treatment.

One preferred application technique involves passing the aqueous nitrous acid solution over the surface of the membrane in a continuous stream. This allows the use of relatively low concentrations of nitrous acid. When the nitrous acid is depleted from the treating medium, it can be replenished and the medium recycled to the membrane surface for additional treatment. Batch treatments are also operable. The specific technique for applying aqueous nitrous acid is not particularly limited and includes spraying, film coating, rolling, or through the use of a dip tank among other application techniques. Once treated the membrane may be washed with water and stored either wet or dry prior to use. For RO and NF applications, membranes treated with nitrous acid preferably have a NaCl rejection of at least 2% when tested using an aqueous NaCl solution (250 ppm) at 25° C. and 70 psi.

A representative reaction scheme illustrating the treatment of the polyamide with nitrous acid is provided below.

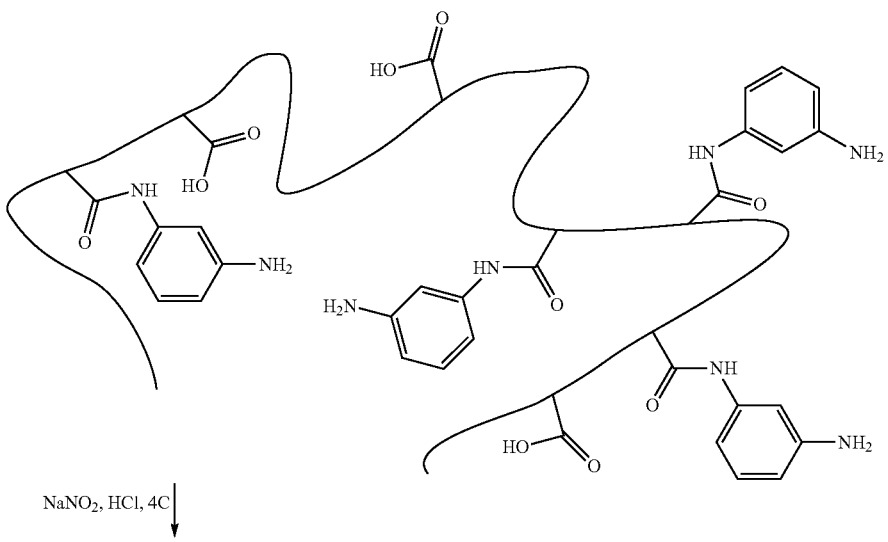

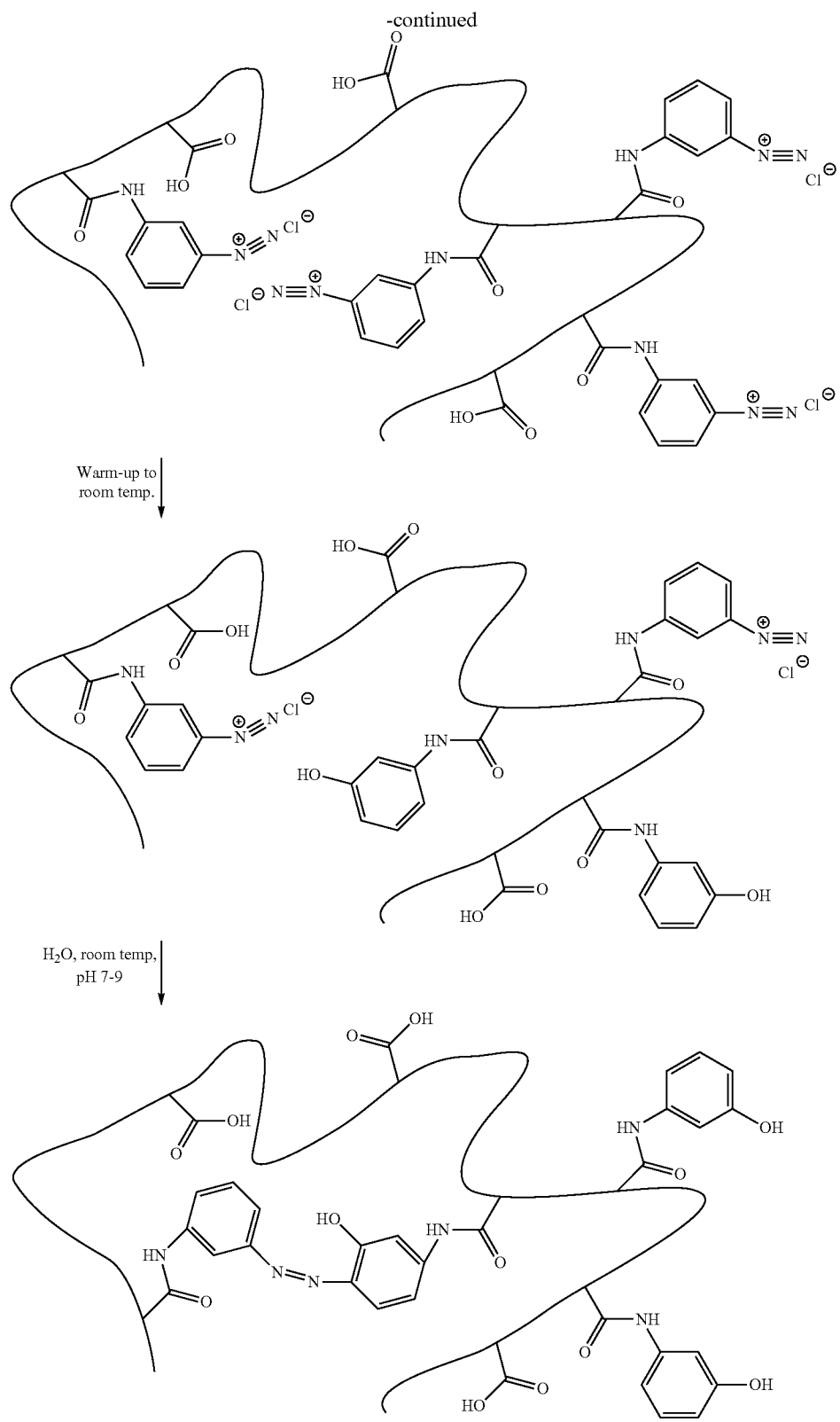

The thin film polyamide layer of the subject membranes preferably has an azo content of from 0.50% to 2.00%, 0.75% to 0.95%, more preferably 0.80 to 0.90%, wherein the term "azo content" refers to the amount of diazonium coupling (diazo coupling and azo coupling) resulting from two aromatic compounds that are coupled by a —N═N— group. Diazonium cations which are generated by treatment of aromatic amine with nitrous acid or stronger mineral acid, may participate in an electrophilic aromatic substitution reaction as an electrophile. The electrophilic reaction center is the terminal nitrogen of the —N=N$^+$ group in a coupling reactions with anilines or phenols. As a result, two aromatic compounds are coupled by —N=N— group. The resultant reaction is called diazonium coupling in which a representative reaction scheme is illustrated above. Pyrolysis gas chromatography is the preferred technique for measure the azo content of the thin film polyamide layer. By way of example, the azo content of the thin film polyamide layer may be determined by using a Frontier Lab 2020iD pyrolyzer mounted on an Agilent 6890GC with a 30 m×0.32 mm 10 μm Molsieve 5 Å PLOT from Agilent connected to a thermal conductivity detector (TCD). Ammonium dichromate ($NH_4Cr_2O_7$) is used as a calibration standard which upon thermal degradation at 600° C. produced one mole of $N_2$. A standard calibration solution is made by dissolving approximately 10 mg of $NH_4Cr_2O_7$ in 10 mL of water. To make the calibration solutions, 2, 3, 4, and 5 μL of the standard solution are deposited into the sample cups and linear least squares routine is used to develop a response factor. Pyrolysis on the standards is performed at 600° C. for 6 seconds. The backing and polysulfone layers of the composite polyamide membrane are removed (delaminated) and the resulting membrane is weighed into sample cups in the range of 200 μg and pyrolyzed at 550° C. for 6 seconds using the single shot mode. The sample weight was used to determine the weight percent of $N_2$ released from the membranes which corresponds to the weight percent of azo (—N=N—) linkages in the membranes. For the gas chromatography conditions, the columns are maintained at a constant flow of 1.8 mL/min of helium with the injector having a split ratio of 30:1 at 280° C. The oven is programmed from 38° C. for 1 minute and 38 to 200° C. at 25° C. per minute. The TCD is maintained at 150° C. with a reference flow of 14 mL/min and combined flow of 7 mL/min. This methodology was used to determine the azo content of the samples described in the Example section.

In a preferred embodiment, the thin film polyamide layer is characterized by having dissociated carboxylate content (COOH moles/kg) of less than 0.18, 0.16, 0.10 or 0.09 moles/kg of polyamide at pH 9.5 as measured by a Rutherford Backscattering (RBS) measurement technique. More specifically, samples membranes (1 inch×6 inch) are boiled for 30 minutes in deionized water (800 mL), and then placed in a 50/50 w/w solution of methanol and water (800 mL) to soak overnight. Next, 1 inch×1 inch size sample of these membranes are immersed in a 20 mL $1×10^{-4}$ M $AgNO_3$ solution with pH adjusted to 9.5 for 30 minutes. Vessels containing silver ions are wrapped in tape and to limit light exposure. After soaking with the silver ion solution, the unbound silver is removed by soaking the membranes in 2 clean 20 mL aliquots of dry methanol for 5 minutes each. Finally, the membranes are allowed to dry in a nitrogen atmosphere for a minimum of 30 minutes. Membrane samples are mounted on a thermally and electrically conductive double sided tape, which was in turn mounted to a silicon wafer acting as a heat sink. The tape is preferably Chromerics Thermattach T410 or a 3M copper tape. RBS measurements are obtained with a Van de Graff accelerator (High Voltage Engineering Corp., Burlington, Mass.); A 2 MeV $He^+$ room temperature beam with a diameter of 3 mm at an incident angle of 22.5°, exit angle of 52.5°, scattering angle of 150°, and 40 nanoamps (nAmps) beam current. Membrane samples are mounted onto a movable sample stage which is continually moved during measurements. This movement allows ion fluence to remain under $3×10^{14}$ $He^+/cm^2$. Analysis of the spectra obtained from RBS is carried out using SIMNRA®, a commercially available simulation program. A description of its use to derive the elemental composition from RBS analysis of RO/NF membranes is described by; Coronell, et. al. *J. of Membrane Sci.* 2006, 282, 71-81 and *Environmental Science & Technology* 2008, 42(14), 5260-5266. Data can be obtained using the SIMNRA® simulation program to fit a two layer system, a thick polysulfone layer beneath a thin polyamide layer, and fitting a three-layer system (polysulfone, polyamide, and surface coating) can use the same approach. The atom fraction composition of the two layers (polysulfone before adding the polyamide layer, and the surface of final TFC polyamide layer) is measured first by XPS to provide bounds to the fit values. As XPS cannot measure hydrogen, an H/C ratio from the proposed molecular formulas of the polymers were used, 0.667 for polysulfone and a range of 0.60-0.67 was used for polyamide. Although the polyamides titrated with silver nitrate only introduces a small amount of silver, the scattering cross section for silver is substantially higher than the other low atomic number elements (C, H, N, O, S) and the size of the peak is disproportionately large to the others despite being present at much lower concentration thus providing good sensitivity. The concentration of silver is determined using the two layer modeling approach in SIMNRA® by fixing the composition of the polysulfone and fitting the silver peak while maintaining a narrow window of composition for the polyamide layer (layer 2, ranges predetermined using XPS). From the simulation, a molar concentration for the elements in the polyamide layer (carbon, hydrogen, nitrogen, oxygen and silver) is determined. The silver concentration is a direct reflection of the carboxylate molar concentration available for binding silver at the pH of the testing conditions. The moles of carboxylic acids groups per unit area of membrane is indicative of the number of interactions seen by a species passing through the membrane, and a larger number will thus favorably impact salt passage. This value may be calculated by multiplying the measured carboxylate content by a measured thickness and by the polyamide density. Alternatively, the carboxylate number per unit area of membrane (moles/m$^2$) may be determined more directly by methods that measure the total complexed metal within a known area. Approaches using both Uranyl acetate and toluidine blue O dye are described in: Tiraferri, et. al., *Journal of Membrane Science,* 2012, 389, 499-508. An approach to determine the complexed cation (sodium or potassium) content in membranes by polymer ashing is described in (Wei Xie, et al., *Polymer*, Volume 53, Issue 7, 22 Mar. 2012, Pages 1581-1592).

A preferred method to determine the dissociated carboxylate content at pH 9.5 per unit area of membrane for a thin film polyamide membrane is as follows. A membrane sample is boiled for 30 minutes in deionized water, and then placed in a 50 wt % solution of methanol in water to soak overnight. Next, the membrane sample is immersed in a $1×10^{-4}$ M $AgNO_3$ solution with pH adjusted to 9.5 with NaOH for 30 minutes. After soaking in the silver ion solution, the unbound silver is removed by soaking the membranes twice in dry methanol for 30 minutes. The amount of silver per unit area is preferably determined by ashing, as described by Wei, and redissolving for measurement by ICP. This methodology was used to determine the dissociated carboxylate content of the samples described in the Example section.

In another preferred embodiment, pyrolysis of the thin film polyamide layer at 650° C. results in a ratio of responses from a flame ionization detector for fragments produced at 212 m/z and 237 m/z of equal to or greater than 1.80% (i.e. ratio of dimers produced at 212 m/z to those produced at 237 m/z. The fragments produced at 212 and 237 m/z are represented by Formula II and III, respectively.

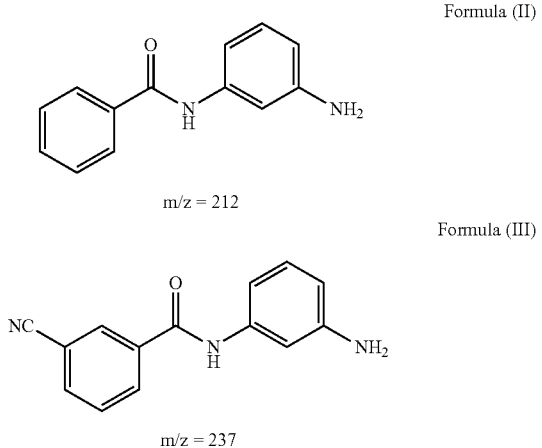

The ratio of fragments (Formula II:Formula III) is believed to be indicative of polymer structures that provide improved flux, With reference to FIG. 1, investigation has shown that the dimer fragment at 212 m/z forms predominantly during pyrolysis temperatures below 500° C. whereas the dimer fragment 237 m/z predominantly forms at pyrolysis temperatures above 500° C. This indicates that dimer fragment 212 originates from end groups where only single bound cleavage prevails and that dimer fragment 237 originates substantially from the bulk material where multiple bond cleavages and reduction occurs. Thus, the ratio of dimer fragment 212 m/z to that at 237 m/z can be used as a measure of relative conversion. Said another way, larger dimer ratios (212 m/z:237 m/z) are indicative of a less branched network structure which is theorized to provide less morphological barriers to transport and hence greater flux. A preferred pyrolysis methodology was conducted using a Frontier Lab 2020iD pyrolyzer mounted on an Agilent 6890 GC according to the Frontier Lab manufacturer conditions. Peak area detection was made using a flame ionization detector (FID). Membrane samples were weighed into Frontier Labs silica lined stainless steel cups using a Mettler E20 micro-balance capable of measuring to 0.001 mg. Sample weight targets were 200 µg+/−50 µg. The pyrolysis was conducted by dropping the sample cup into the oven set at 650° C. for 6 seconds in single shot mode. Separation was performed using a 30M×0.25 mm id with a 1 µm 5% phenyl methyl silicone internal phase column from Varian (FactorFour VF-5MS CP8946). Gas chromatograph conditions were the following: Agilent 6890 GC (SN: CN10605069), with a 30M×0.25 mm, 1 µm 5% dimethyl polysiloxane phase (Varian FactorFour VF-5MS CP8946). Injection port 320° C., Detector port: 320° C., Split injector flow ratio of 50:1, GC Oven conditions: 40° C. to 110° C. at 5° C. per min., 110° C. to 320° C. at 20° C./min, 320° C. for 10 min; Helium carrier gas with constant flow of 0.6 mL/min (17 cm/sec) providing a back pressure of 8.0 psi. Detector gas flows: $H_2$ at 40 mL/min, air at 400 mL/min, He makeup at 30 mL/min. The FID peak area of the fragment 212 m/z and fragment 237 m/z are normalized to the sample weight. The normalized peak areas are used to determine the ratio of fragments 212 m/z to 237 m/z. Further the normalize peak area of fragment 212 m/z is divided by the sum of the normalized peak areas for all other fragments providing a fraction of the m/z 212 fragment relative to the polyamide and is commonly noted as a percent composition by multiplying by 100. This methodology was used to determine the dimer content reported for the samples in the Example section. Preferably this value is equal to or greater than 1.80%, 2.0%, 2.5%, 2.6%, 3.0%, 3.10%, 3.2%, 3.25%, 4% and less than 5%.

In another embodiment of the invention, the thin film polyamide layer preferably has a ratio of carboxylic acid functional groups to amide groups (—COOH:(—C(O)NH—)) of equal to or less than 0.13, 0.10, 0.09 or 0.08 as determined by ATR IR. A preferred method for determining this ratio is conducted by first isolating the polyamide layer from the porous support by first delaminating from the backing sheet. The delaminated membrane is then immersed in a solvent suitable to dissolve the porous support (e.g. dimethyl formamide). After dissolving the porous support, the insoluble polyamide is collected by filtration, washed 2 times dimethylformamide, 2 times with DI water, and 2 times with methanol then dried in a vacuum oven at 50° C. for 20 hours. Infrared spectra of delaminated polyamide layer may be acquired with a Perkin Elmer Spectrum One FT-IR and Universal ATR Sampling Accessory at a nominal resolution of 4 $cm^{-1}$ and 16 scans (approximate acquisition time of 90 seconds). The Universal ATR Sampling Accessory is preferably equipped with a single bounce diamond/ZnSe crystal. The carboxylic acid peak height was measured at 1706 $cm^{-1}$ with a single-point baseline at 1765 $cm^{-1}$. The amide peak height was measured at 1656 $cm^{-1}$ with a single-point baseline at 1765 $cm^{-1}$. This method was used to analyze the samples described in the Example section.

In a preferred embodiment, polyamide layers of the present invention possessed significantly lower COOH/amide ratios that control layers tested in the example section; suggesting that the polymerization was more complete than that control membranes. The resulting structure appears to have a greater degree of "openness" or flexibility which is expected to facilitate the diazo reaction described below.

The thin film polyamide layer may optionally include hygroscopic polymers upon at least a portion of its surface. Such polymers include polymeric surfactants, polyacrylic acid, polyvinyl acetate, polyalkylene oxide compounds, poly(oxazoline) compounds, polyacrylamides and related reaction products as generally described in U.S. Pat. No. 6,280,853; U.S. Pat. No. 7,815,987; U.S. Pat. No. 7,918,349 and U.S. Pat. No. 7,905,361. In some embodiments, such polymers may be blended and/or reacted and may be coated or otherwise applied to the polyamide membrane from a common solution, or applied sequentially.

Many embodiments of the invention have been described and in some instances certain embodiments, selections, ranges, constituents, or other features have been characterized as being "preferred." Characterizations of "preferred" features should in no way be interpreted as deeming such features as being required, essential or critical to the invention.

EXAMPLES

Example 1

Sample membranes were prepared using a pilot scale membrane manufacturing line. Polysulfone supports were casts from 16.5 wt % solutions in dimethylformamide (DMF) and subsequently soaked in an aqueous solution meta-phenylene diamine (mPD). The resulting support was then pulled through a reaction table at constant speed while a thin, uniform layer of a non-polar coating solution was applied. The non-polar coating solution included a isoparaffinic solvent (ISOPAR L) and trimesoyl acid chloride (TMC). In selected samples, the non-polar coating solution further included tri butyl phosphate (TBP) provided in a 1:1.5 stoichiometric ratio with TMC. Excess non-polar solution was removed and the resulting composite membrane was passed through water rinse tanks and drying ovens. Monomer content is summarized in Table 1. A summary of sample preparation is summarized in Table 2. Sample membrane sheets were then either (i) stored in deionized water until testing; or (ii) "post treated" by being soaked for approximately 15 minutes in a solution at 5-15° C. prepared by combining 0.05% w/v $NaNO_2$ and 0.1 w/v % HCl and thereafter rinsed and stored in deionized water at room temperature until testing. Testing was conducted using a 2000 ppm NaCl solution at room temperature, pH 8 and 150 psi. Mean average flux is expressed in GFD. As shown by the test results summarized in Table 3, post-treatment of samples produced using a tri-hydrocarbyl compound had an unexpected improvement in flux over comparable post-treated control membranes.

TABLE 1

| Monomer content | Series A | Series B | Series C | Series D | Series E |
|---|---|---|---|---|---|
| mPD (wt/vol %) | 2.5 | 3.5 | 3.5 | 3.5 | 4.5 |
| TMC (wt/vol %) | 0.15 | 0.15 | 0.19 | 0.23 | 0.15 |

TABLE 2

| Sample Series | |
|---|---|
| 1-(1, 2, 3, 4)a | Control (made via method consistent with the teaching of U.S. Pat. No. 4,277,344) |
| 1-(1, 2, 3, 4)b | Control w/ "post treatment (via method consistent with U.S. Pat. No. 4,888,116) |
| 1-(1, 2, 3, 4)c | w/ TBP in 1:1.5 stoichiometric ratio with TMC (made via a method consistent with U.S. Pat. No. 6,878,278) |
| 1-(1, 2, 3, 4)d | w/ TBP in 1:1.5 stoichiometric ratio with TMC and "post treatment" |

TABLE 3

| Sample | Avg Flux (GFD) (SD) | NaCl Passage (%) (SD) | Disassociated carboxylate content (moles/kg) | Azo content (%) | COOH/ amide | Dimer ratio (%) |
|---|---|---|---|---|---|---|
| 1-1a | 11.8 (0.27) | 1.8 (0.36) | 0.11 | | 0.12 | 1.67 |
| 1-1b* | 11.7 (0.69) | 2.19 (0.92) | 0.13 | 1.13 | 0.14 | 1.90 |
| 1-1c | 52.1 (1.39) | 1.50 (0.24) | 0.06 | | 0.13 | 1.46 |
| 1-1d* | 68.1 (2.55) | 1.77 (0.13) | 0.07 | 0.83 | 0.10 | 3.26 |
| 1-2a | 20.7 (0.36) | 0.74 (0.08) | 0.15 | | 0.13 | 1.69 |
| 1-2b* | 24 (0.36) | 0.95 (0.08) | 0.16 | 0.99 | 0.13 | 1.71 |
| 1-2c | 36.2 (0.72) | 0.63 (0.02) | 0.10 | | 0.10 | 1.54 |
| 1-2d* | 48.3 (1.63) | 0.73 (0.01) | 0.16 | 0.88 | 0.09 | 3.18 |
| 1-3a | 13.9 (0.44) | 0.97 (0.07) | 0.14 | | 0.13 | 1.59 |
| 1-3b* | 14.9 (0.56) | 1.11 (0.03) | 0.21 | 0.97 | 0.11 | 1.84 |
| 1-3c | 40.7 (1.39) | 0.75 (0.13) | 0.13 | | 0.09 | 1.50 |
| 1-3d* | 52.7 (1.92) | 0.92 (0.02) | 0.16 | 0.87 | 0.09 | 3.73 |
| 1-4a | 11.9 (1.16) | 1.18 (0.03) | 0.18 | | 0.10 | 1.93 |
| 1-4b* | 11.9 (1.57) | 1.21 (0.17) | 0.21 | 1.01 | 0.12 | 1.86 |
| 1-4c | 40.3 (0.84) | 0.94 (0.08) | 0.08 | | 0.08 | 1.67 |
| 1-4d* | 52.6 (1.94) | 1.22 (0.09) | 0.06 | 0.94 | 0.10 | 2.40 |
| 1-5a | 22.6 (0.54) | 0.65 (0.01) | 0.10 | | 0.11 | 1.47 |
| 1-5b* | 27.6 (0.14) | 0.63 (0.02) | 0.11 | 1.07 | 0.12 | 1.62 |
| 1-5c | 23.9 (0.49) | 0.57 (0.06) | 0.04 | | 0.08 | 1.90 |
| 1-5d* | 32.6 (0.39) | 0.51 (0.01) | 0.07 | 0.83 | 0.09 | 2.6 |

Samples subjected to post-treatment with nitrous acid are designed with an asterisk (*).

Example 2

In order to further illustrate the synergistic impact of preparing composite polyamide membranes with a tri-hydrocarbyl compound and post-treatment with nitrous acid, a series of membrane were prepared using increasing amount of tri ethyl phosphate (TEP) in the water phase. mPD content in the polar phase was fixed at 3.5 wt % and TMC at 0.26 wt % in the non-polar phase. Samples subjected to post-treatment and testing in the same manner as described in Examples 1 and 2. As shown by the test results summarized in Table 4, post-treatment of samples produced using a tri-hydrocarbyl compound had an unexpected improvement in flux over comparable post-treated membranes without a tri-hydrocarbyl compound.

TABLE 4

| Sample | TEP (wt %) | Mean Avg Flux (GFD) | Mean Avg NaCl Passage (%) | Std Dev (Avg Flux) | Std Dev (Avg NaCl Passage) |
|---|---|---|---|---|---|
| 2-1a | 0 | 13.82 | 0.93 | 0.35 | 0.11% |
| 2-1b* | 0 | 15.38 | 1.79 | 0.66 | 0.27% |
| 2-2a | 0.03 | 18.64 | 0.87 | 0.55 | 0.12% |
| 2-2b* | 0.03 | 21.88 | 1.45 | 1.24 | 0.20% |
| 2-3a | 0.1 | 22.24 | 0.73 | 0.48 | 0.17% |
| 2-3b* | 0.1 | 27.11 | 1.13 | 0.54 | 0.15% |
| 2-4a | 0.3 | 31.94 | 0.63 | 0.43 | 0.09% |
| 2-4b* | 0.3 | 41.04 | 0.87 | 0.86 | 0.04% |
| 2-5a | 0.5 | 32.39 | 0.70 | 0.52 | 0.14% |
| 2-5b* | 0.5 | 43.37 | 1.01 | 1.50 | 0.36% |
| 2-6a | 0.75 | 32.43 | 0.60 | 0.28 | 0.08% |
| 2-6b* | 0.75 | 43.72 | 0.94 | 1.56 | 0.06% |
| 2-7a | 1 | 30.83 | 0.62 | 0.32 | 0.00% |
| 2-7b* | 1 | 41.75 | 1.20 | 1.11 | 0.14% |
| 2-8a | 2 | 19.04 | 5.18 | 0.81 | 0.53% |
| 2-8b* | 2 | 26.98 | 6.14 | 2.27 | 0.88% |

Samples subjected to post-treatment with nitrous acid are designed with an asterisk (*).

The invention claimed is:

1. A thin film composite polyamide membrane comprising a porous support and a thin film polyamide layer characterized by possessing an azo (—N═N—) content of from 0.75% to 0.95%, as measured by pyrolysis gas chromatography using ammonium dichromate as a calibration standard and pyrolizing the polyamide layer at 550° C. for 6 seconds; wherein the azo content refers to the amount of diazonium and azo coupling resulting from two aromatic compounds coupled by an azo (—N═N—) group, and wherein the thin film polyamide layer is further characterized by producing a ratio of dimers represented by Formula II and III from 2.0% to 4.0% upon pyrolysis at 650° C. as measured by GS MS.

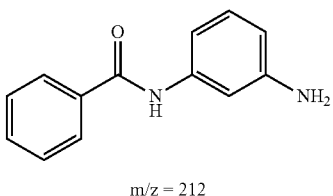

Formula (II)

m/z = 212

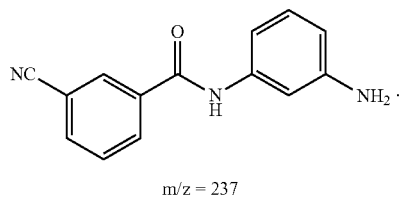

Formula (III)

m/z = 237

2. The membrane of claim 1 wherein the thin film polyamide layer is further characterized by possessing an azo content of from 0.80% to 0.90%.

3. The membrane of claim 1 wherein the thin film polyamide layer is further characterized by producing a ratio the dimers of from 2.4% to 4.0%.

4. The membrane of claim 1 wherein the thin film polyamide layer is further characterized by producing a ratio the dimers of from 3.0% to 4.0%.

5. The membrane of claim 1 wherein the thin film polyamide layer is further characterized by possessing a dissociated carboxylate content of less than 0.18 mol/kg as measured by RBS at pH 9.5.

6. The membrane of claim 1 wherein the thin film polyamide layer is further characterized by possessing a dissociated carboxylate content of less than 0.09 mol/kg as measured by RBS at pH 9.5.

7. The membrane of claim 1 wherein the thin film polyamide layer is further characterized by possessing a COOH/amide ratio of equal to or less than 0.10, as measured by ATR IR.

8. The membrane of claim 1 wherein the thin film polyamide layer is further characterized by possessing a COOH/amide ratio of equal to or less than 0.13, as measured by ATR IR.

9. The membrane of claim 1 wherein the thin film polyamide layer is further characterized by possessing: i) a dimer ratio of from 2.0% to 4.0%, ii) a dissociated carboxylate content of less than 0.09 mol/kg, and iii) a COOH/amide ratio of equal to or less than 0.10.

\* \* \* \* \*